United States Patent [19]

Schmickl et al.

[11] Patent Number: 5,066,329
[45] Date of Patent: Nov. 19, 1991

[54] WRITING FLUID

[75] Inventors: Werner Schmickl, Neumarkt; Roland Meichsner, Buttenheim, both of Fed. Rep. of Germany

[73] Assignee: J. S. Staedtler GmbH & Co., Nuremberg, Fed. Rep. of Germany

[21] Appl. No.: 590,920

[22] Filed: Oct. 1, 1990

[30] Foreign Application Priority Data

Dec. 16, 1989 [DE]  Fed. Rep. of Germany ....... 3941662

[51] Int. Cl.$^5$ ..................... C09D 11/00; C09D 11/16
[52] U.S. Cl. ...................................... 106/20; 106/23; 106/26; 106/29
[58] Field of Search ..................... 106/20, 23, 26, 27, 106/29, 30; 524/18

[56] References Cited

U.S. PATENT DOCUMENTS

| | | | |
|---|---|---|---|
| 3,891,581 | 6/1975 | Argenio | 106/30 |
| 4,074,967 | 2/1978 | Fuchs et al. | 8/527 |
| 4,303,924 | 12/1981 | Young, Jr. | 106/22 |
| 4,532,276 | 7/1985 | Knäble et al. | 524/18 |
| 4,665,163 | 5/1987 | Hunger et al. | 106/23 |

FOREIGN PATENT DOCUMENTS 55-67225 12/1982 Japan .

Primary Examiner—William R. Dixon, Jr.
Assistant Examiner—Tim A. Saunder
Attorney, Agent, or Firm—Pascal & Associates

[57] ABSTRACT

In order to delay the drying of an aqueous writing fluid at an exposed point of a writing utensil, an ether is added to the aqueous writing fluid, the ether having a polyglycol radical and a single alcohol radical whose gel point is above 30° Celsius and which is dispersed in the writing fluid. An example of such an ether is cetyl alcohol-n-polyglycol ether with n=5 or 6.

11 Claims, No Drawings

WRITING FLUID

The invention concerns a writing fluid and particularly to a writing fluid having at least one additive which reduces drying of the writing fluid at the point of a writing utensil.

As is generally known, the disadvantage of aqueous India inks and some other inks is that the writing fluid dries up fairly quickly at the point of the writing utensil. The length of time it takes to dry is called cap-off-time. In order to prolong the drying time, it is generally known that one adds glycol to the aqueous writing fluid. In order to significantly prolong the drying time, it is necessary to add relatively large amounts of glycol, for example, more than 10%. However, the disadvantage of this is that the aqueous writing fluid runs, in particular, on standard paper. This running of the aqueous writing fluid is particularly disadvantageous when one is trying to produce fine lines or dots. This is true, for example, for India ink fountain pens having a small stroke width of, for example, 0.25 mm and less.

This disadvantage appears, in particular, in highly dissolving ink-jet printers which have a resolution of more than 300 dots per inch. In order not to defeat this high resolution by running ink dots, it is necessary to use an ink having as little glycol content as possible in these printers which, in turn, however leads to the disadvantage that the ink dries out at the nozzles of the printing heads.

According to the U.S. Pat. No. 4,822,417, it is known to prolong the cap-off-time in solvent inks by adding decaglyceric fatty acid ester. With the formula noted in that patent, there is an acyl-group or a hydrogen atom for the respective radical. This ink has an organic solvent in which the dye, a resin as well as the above-noted ester is dissolved. When the organic solvent evaporates at the point of the writing utensil, the ester prevents a binding between the dye and the resin. A light film is produced which prevents further evaporation of the solvent and is easily destroyed when the writing utensil is used again. However, it is a prerequisite in this case that the ink should contain an organic solvent in which the other constituents of the ink are dissolved.

It is an object of the invention to combine the aqueous writing fluid in such a way that its drying on the writing heads is substantially delayed.

In accordance with an embodiment of the invention a water-based writing fluid has at least one additive which reduces drying of the writing fluid at the point of a writing utensil, the additive consisting of an ether having a polyglycol radical and a single alcohol radical, whose gel point is greater than 30° Celsius and which is dispersed in the aqueous writing fluid.

Thus small amount of at least one ether, which consists of a polyglycol radical and a single alcohol radical, is added to the writing fluid. The gel point of this ether, i.e. the temperature at which the ether just stops to flow, should be above 30° Celsius. This ether should be dispersible in the aqueous writing fluid.

The above-noted ether can be represented by the following formula:

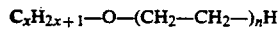

$$C_xH_{2x+1}-O-(CH_2-CH_2-)_nH$$

The gel point of ether in which x is less than or equal to 15 is usually below 30° Celsius. Thus, it is preferable to use ethers in which the value of x is greater than 15.

Ethers, in which the value of n is greater than 8, are largely soluble in the aqueous writing fluid so that the value of n should not be greater than 8.

Ethers, in which n is less than or equal to 2, can only be dispersed with difficulty in the aqueous writing fluid.

It has been shown that ethers in which the value of x is greater than or equal to 16 and less than or equal to 18 and in which the value of n is greater than or equal to 4 and less than or equal to 6 are particularly suitable.

Those ethers which are particularly suitable are: cetyl alcohol-n-polyglycol ether with 5 or 6 glycol groups and stearyl alcohol-n-polyglycol ether with 4 or 5 glycol groups.

Preferably, a dispersing agent is added to the writing fluid in addition to the dispersible ether. Moreover, the aqueous writing fluid can contain small amounts of glycol, in particular, diethylene glycol.

Comparison tests were carried out with inks and India inks with the following compounds.

Compound No. 1: $C_{16}H_{33}-O-(CH_2-CH_2-O)_6H$, Cetyl alcohol-6-polyglycol ether.

Compound No. 2: $C_{18}H_{37}-O-(CH_2-CH_2-O)_5H$, Stearyl alcohol-5-polyglycol ether.

Compound No. 3: $C_{12}H_{23}-O-(CH_2-CH_2-O)_4H$, Lauryl alcohol-4-polyglycol ether.

Compound No. 4: $C_{18}H_{37}-O-(CH_2-CH_2-O)_4H$, Stearyl alcohol-4-polyglycol ether.

Compound No. 5: $C_{18}H_{37}-O-(CH_2-CH_2-O)_8H$, Stearyl alcohol-8-polyglycol ether.

Compound No. 6: $C_{18}H_{37}-O-(CH_2-CH_2-O)_2H$, Stearyl alcohol-2-polyglycol ether.

All the following tests were carried out at room temperature and at a relative humidity of 55 to 60%.

Tests with inks for ink-jet printers were carried out first. The tests were carried out with a desk-jet printer of the Hewlett Packard Company.

| | A | B | C | D | E1 | E2 | F | G |
|---|---|---|---|---|---|---|---|---|
| 1 | 2.5 | 3.0 | 0.2 | — | — | — | 94.3 | 20 min |
| 2 | 2.5 | 3.0 | 0.2 | 0.02 | — | — | 94.28 | 20 min |
| 3 | 2.5 | 3.0 | 0.2 | 0.02 | No 3 | 0.1 | 94.18 | 25 min |
| 4 | 2.5 | 3.0 | 0.2 | 0.02 | No 6 | 0.1 | 94.18 | 2 h |
| 5 | 2.5 | 3.0 | 0.2 | 0.02 | No 5 | 0.1 | 94.18 | 1 d |
| 6 | 2.5 | 3.0 | 0.2 | 0.02 | No 1 | 0.1 | 94.18 | 15 d |
| 7 | 2.5 | 3.0 | 0.2 | 0.02 | No 4 | 0.1 | 94.18 | 15 d |
| 8 | 2.5 | 3.0 | 0.2 | 0.02 | No 2 | 0.1 | 94.18 | 30 d |

A = dye direct black 168 (Li form)
B = diethylene glycol
C = preservative
D = dispersing agent
E1 = compound no.
E2 = portion of E1
F = demineralized water
G = result = cap-off-time A=dye direct black 168 (Li form) B=diethylene glycol C=preservative D=dispersing agent E1=compound no. E2=portion of E1 F=demineralized water G=result=cap-off-time The comparison tests with inks 1 and 2 resulted in a cap-off-time of 20 minutes. A cap-off-time of one day was attained with compound No. 5. Excellent results were obtained with compound Nos. 1, 2 and 4 were used.

Next, inks for fiber printers were examined, whereby the fiber printers used were filled directly, that is, they had no fiber reservoir for the ink. The following results were obtained in this case.

|   | B | C | D | E1 | E2 | F | G |
|---|---|---|---|----|----|---|---|
| A |   |   |   |    |    |   |   |
| 1 | 4.0 | 5.0 | 0.2 | 0.02 | — | — | 90.78 | 1 h |
| 2 | 4.0 | 5.0 | 0.2 | 0.02 | No 2 | 0.18 | 90.60 | 7 d |
| H |   |   |   |    |    |   |   |
| 3 | 17.5 | 5.0 | 0.2 |    |    |   | 77.3 | 4 min |
| 4 | 17.5 | 5.0 | 0.2 |    | No 2 | 0.3 | 77.0 | 1 h |
| I |   |   |   |    |    |   |   |
| 5 | 4.0 | 3.0 | 0.2 |    |    |   | 92.8 | 1 h |
| 6 | 4.0 | 3.0 | 0.2 | 0.02 | No 2 | 0.1 | 92.68 | 15 h |

H = carbon black dispersion glycol free (portion of carbon black 33%)
I = acid green 16

The results with inks 1 and 2 show that the drying time was prolonged from one hour to seven days. With inks 3 and 4, the drying time was prolonged from four minutes to one hour, whereas with inks 5 and 6 it was prolonged from one hour to fifteen hours. The tests were carried out in such a way that the fiber printers were started at different intervals and the respective test was ended when the fiber printer no longer delivered any ink.

Additional tests were carried out with India ink by using an India ink fountain pen having a line width of 0.35 mm. One started to write with the India ink fountain pen at given time intervals without first shaking it. In addition, one started to write with the India ink fountain pen at regular intervals after having previously shaken it five times. The results are shown in the following table.

|   | K | L | C | M | D | E1 | E2 | F | G* |
|---|---|---|---|---|---|----|----|---|----|
| 1 | 36 | 3.6 | 0.7 | 11 | 0.2 | — | — | 48.5 | 15 min/2 h |
| 2 | 36 | 3.6 | 0.7 | 11 | 0.2 | No 2 | 0.3 | 48.2 | 4 h/8 h |

K = carbon black dispersion 25% portion of carbon black
L = 1.6 hexane diol
M = shellac dissolution 40%
G* = first value - without shaking/second value - shaking five times Without prior shaking, the cap-off-time increased from fifteen minutes to four hours; with shaking, it increased from two hours to eight hours.

What is claimed is:

1. A water-based writing fluid having at least one additive which reduces drying of the writing fluid at the point of a writing utensil, the additive comprising an ether having a polyglycol radical and a single alcohol of the formula $C_xH_{2x+1}$—O—$(CH_2$—$CH_2$—$O)_n$H, whose gel point is greater than 30° Celsius, which is dispersed in the aqueous writing fluid, the value of x being greater than or equal to 16 and less than or equal to 18 and the value of n being not greater than 8.

2. A writing fluid as defined in claim 1, in which the value of n is greater than or equal to 4 and less than or equal to 6.

3. A writing fluid as defined in claim 2, in which the additive consists of cetyl alcohol-n-polyglycol ether in which n is equal to 5 or 6.

4. A writing fluid as defined in claim 2, in which the additive consists of stearyl alcohol-n-polyglycol ether in which n is equal to 4 or 5.

5. A writing fluid as defined in any one of claims 2 to 5, further including a dispersing agent.

6. A writing fluid as defined in any one of claims 2 to 5, further including glycol.

7. A writing fluid as defined in claim 6, in which the glycol is diethylene glycol.

8. A writing fluid as defined in claim 6, in which the part by weight of the glycol is about 3% to 5% relative to the total weight of the writing fluid.

9. A writing fluid as defined in claim 7, in which the part by weight of the glycol is about 3% to 5% relative to the total weight of the writing fluid.

10. A writing fluid as defined in any one of claims 2 to 5, in which the part by weight of the ether is about 0.1% to 0.3% relative to the total weight of the writing fluid.

11. A writing fluid as defined in claim 8, in which the part by weight of the ether is about 0.1% to 0.3% relative to the total weight of the writing fluid.

* * * * *